(12) United States Patent
Anderson (10) Patent No.: US 11,073,023 B2
(45) Date of Patent: Jul. 27, 2021

(54) AIRFOIL HAVING IMPROVED THROUGHFLOW COOLING SCHEME AND DAMAGE RESISTANCE

(71) Applicant: United Technologies Corporation, Farmington, CT (US)

(72) Inventor: Corey D. Anderson, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 601 days.

(21) Appl. No.: 16/107,160

(22) Filed: Aug. 21, 2018

(65) Prior Publication Data
US 2020/0063572 A1 Feb. 27, 2020

(51) Int. Cl.
*F01D 5/18* (2006.01)
*F01D 9/04* (2006.01)

(52) U.S. Cl.
CPC ............. *F01D 5/186* (2013.01); *F01D 5/187* (2013.01); *F01D 9/041* (2013.01); *F05D 2240/12* (2013.01); *F05D 2260/201* (2013.01); *F05D 2260/202* (2013.01); *F05D 2260/205* (2013.01)

(58) Field of Classification Search
CPC .......... F01D 9/041; F01D 5/186; F01D 5/187; F05D 2240/12; F05D 2240/80
See application file for complete search history.

(56) References Cited

U.S. PATENT DOCUMENTS

| | | | | |
|---|---|---|---|---|
| 5,484,258 A | * | 1/1996 | Isburgh | F01D 5/187 415/115 |
| 5,516,260 A | * | 5/1996 | Damlis | F01D 5/189 415/115 |
| 5,931,638 A | * | 8/1999 | Krause | F01D 5/186 415/115 |
| 6,261,054 B1 | * | 7/2001 | Bunker | F01D 5/187 415/115 |
| 6,454,526 B1 | * | 9/2002 | Cunha | F01D 5/147 415/115 |
| 6,478,535 B1 | * | 11/2002 | Chung | F01D 5/187 415/115 |

(Continued)

FOREIGN PATENT DOCUMENTS

| | | |
|---|---|---|
| EP | 3498979 A1 | 6/2019 |
| GB | 2523140 A | 8/2015 |

OTHER PUBLICATIONS

European Search Report for European Application No. 19192835.7, International Filing Date Aug. 21, 2019, dated Jan. 13, 2020, 6 pages.

*Primary Examiner* — Michael Lebentritt
*Assistant Examiner* — Topaz L. Elliott
(74) *Attorney, Agent, or Firm* — Cantor Colburn LLP (57) ABSTRACT

Vanes for gas turbine engines are described. The vanes include an airfoil body extending between a first platform and a second platform, the airfoil body having a leading edge, a trailing edge, a pressure side, and a suction side and at least one skin core cavity comprising a first skin core cavity, wherein the first skin core cavity defines a throughflow passage through the vane between the first platform and the second platform, wherein the at least one skin core cavity is defined between an external hot wall of the vane and an internal cold wall of the vane.

20 Claims, 4 Drawing Sheets

(56) References Cited

U.S. PATENT DOCUMENTS

| | | | | |
|---|---|---|---|---|
| 7,775,768 B2 * | 8/2010 | Devore | .................. | F01D 5/187 |
| | | | | 416/97 R |
| 7,819,629 B2 * | 10/2010 | Liang | ..................... | F01D 5/187 |
| | | | | 415/115 |
| 8,197,184 B2 * | 6/2012 | Chon | ..................... | F01D 5/185 |
| | | | | 415/115 |
| 8,414,263 B1 | 4/2013 | Liang | | |
| 8,517,667 B1 | 8/2013 | Liang | | |
| 2016/0186587 A1 | 6/2016 | Hagan et al. | | |
| 2018/0023403 A1 | 1/2018 | Jones et al. | | |

* cited by examiner

AIRFOIL HAVING IMPROVED THROUGHFLOW COOLING SCHEME AND DAMAGE RESISTANCE

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external sidewalls. Such cooling cavities are subject to both hot material walls (exterior or external) and cold material walls (interior or internal). Further, different cooling schemes may be necessary for blades and vanes due to operational parameters, environment, and conditions. Although such cavities are designed for cooling portions of airfoil bodies, improved cooling designs may be desirable.

BRIEF DESCRIPTION

According to some embodiments, vanes for gas turbine engines are provided. The vanes include an airfoil body extending between a first platform and a second platform, the airfoil body having a leading edge, a trailing edge, a pressure side, and a suction side and at least one skin core cavity comprising a first skin core cavity, wherein the first skin core cavity defines a throughflow passage through the vane between the first platform and the second platform, wherein the at least one skin core cavity is defined between an external hot wall of the vane and an internal cold wall of the vane.

In addition to one or more of the features described above, or as an alternative, further embodiments of the vanes may include that the first skin core cavity is arranged next to one of the suction side, the pressure side, and the leading edge of the vane.

In addition to one or more of the features described above, or as an alternative, further embodiments of the vanes may include a second skin core cavity.

In addition to one or more of the features described above, or as an alternative, further embodiments of the vanes may include that the second skin core cavity is a throughflow cavity.

In addition to one or more of the features described above, or as an alternative, further embodiments of the vanes may include that a flow direction through the first skin core cavity and the second skin core cavity are the same.

In addition to one or more of the features described above, or as an alternative, further embodiments of the vanes may include that the second skin core cavity is a non-throughflow cavity, the second skin core cavity fluidly connected to an external surface of the vane by at least one exit cooling hole.

In addition to one or more of the features described above, or as an alternative, further embodiments of the vanes may include that the first skin core cavity is arranged next to the suction side of the vane.

In addition to one or more of the features described above, or as an alternative, further embodiments of the vanes may include that the second skin core cavity is arranged next to the pressure side of the vane.

In addition to one or more of the features described above, or as an alternative, further embodiments of the vanes may include that the first skin core cavity is a smooth-walled cavity.

In addition to one or more of the features described above, or as an alternative, further embodiments of the vanes may include that the first skin core cavity comprises at least one exit cooling hole fluidly connecting the first skin core cavity to an external surface of the vane.

In addition to one or more of the features described above, or as an alternative, further embodiments of the vanes may include that the first skin core cavity includes at least one heat transfer augmentation feature.

According to some embodiments, gas turbine engines are provided. The gas turbine engines include a turbine section having a plurality of airfoils, wherein at least one airfoil comprises a vane. The vane includes an airfoil body extending between a first platform and a second platform, the airfoil body having a leading edge, a trailing edge, a pressure side, and a suction side and at least one skin core cavity comprising a first skin core cavity, wherein the first skin core cavity defines a throughflow passage through the vane between the first platform and the second platform, wherein the at least one skin core cavity is defined between an external hot wall of the vane and an internal cold wall of the vane.

In addition to one or more of the features described above, or as an alternative, further embodiments of the gas turbine engines may include that the first skin core cavity is arranged next to one of the suction side, the pressure side, and the leading edge of the vane.

In addition to one or more of the features described above, or as an alternative, further embodiments of the gas turbine engines may include a second skin core cavity, wherein the second skin core cavity is a throughflow cavity.

In addition to one or more of the features described above, or as an alternative, further embodiments of the gas turbine engines may include that a flow direction through the first skin core cavity and the second skin core cavity are the same.

In addition to one or more of the features described above, or as an alternative, further embodiments of the gas turbine engines may include a second skin core cavity, wherein the second skin core cavity is a non-throughflow cavity, the second skin core cavity fluidly connected to an external surface of the vane by at least one exit cooling hole.

In addition to one or more of the features described above, or as an alternative, further embodiments of the gas turbine engines may include a second skin core cavity, wherein the second skin core cavity is arranged next to the pressure side of the vane.

In addition to one or more of the features described above, or as an alternative, further embodiments of the gas turbine engines may include that the first skin core cavity is a smooth-walled cavity.

In addition to one or more of the features described above, or as an alternative, further embodiments of the gas turbine engines may include that the first skin core cavity comprises at least one film cooling hole fluidly connecting the first skin core cavity to an external surface of the vane.

In addition to one or more of the features described above, or as an alternative, further embodiments of the gas turbine engines may include that the first skin core cavity includes at least one heat transfer augmentation feature.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
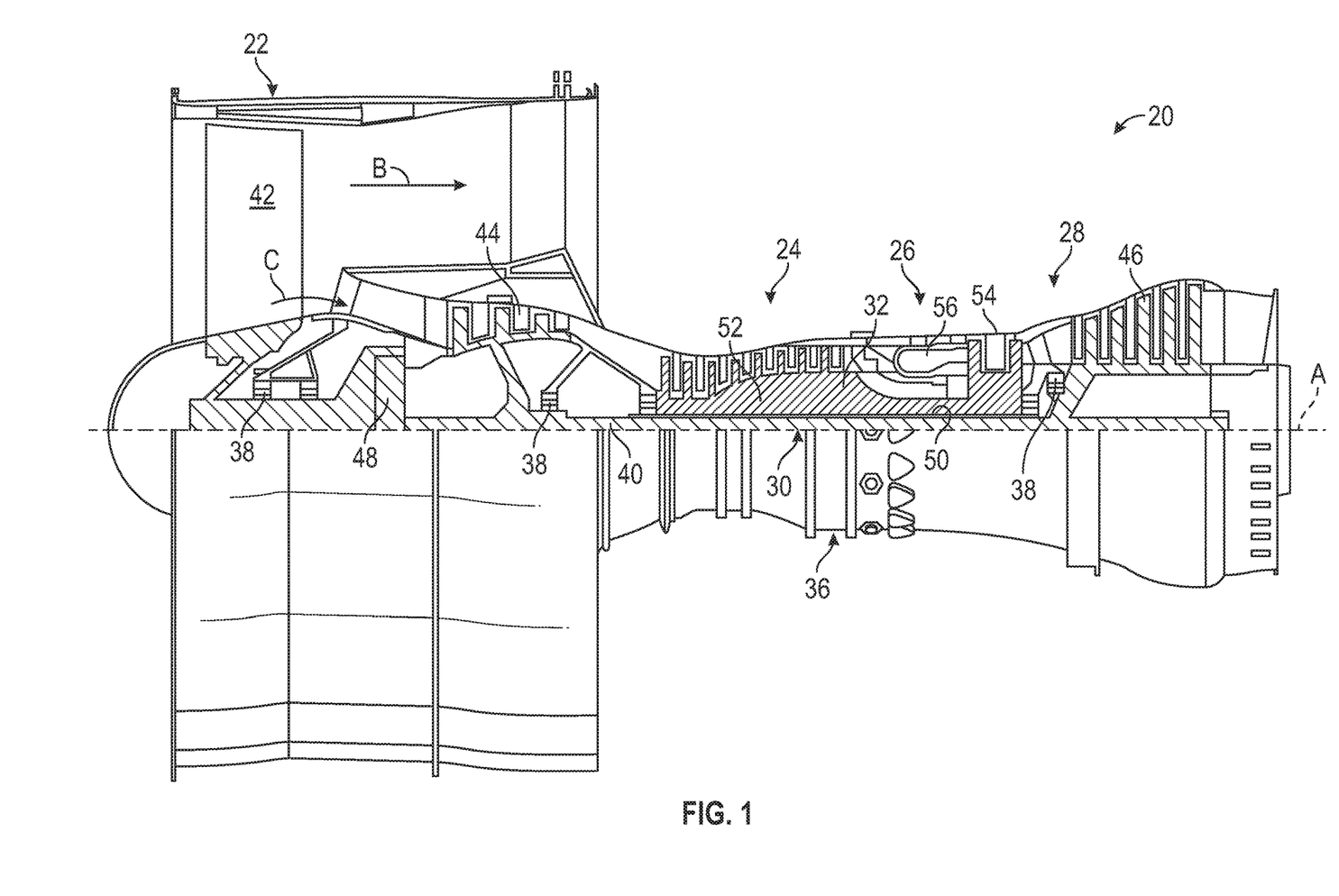
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(514.7° R)]$^5$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
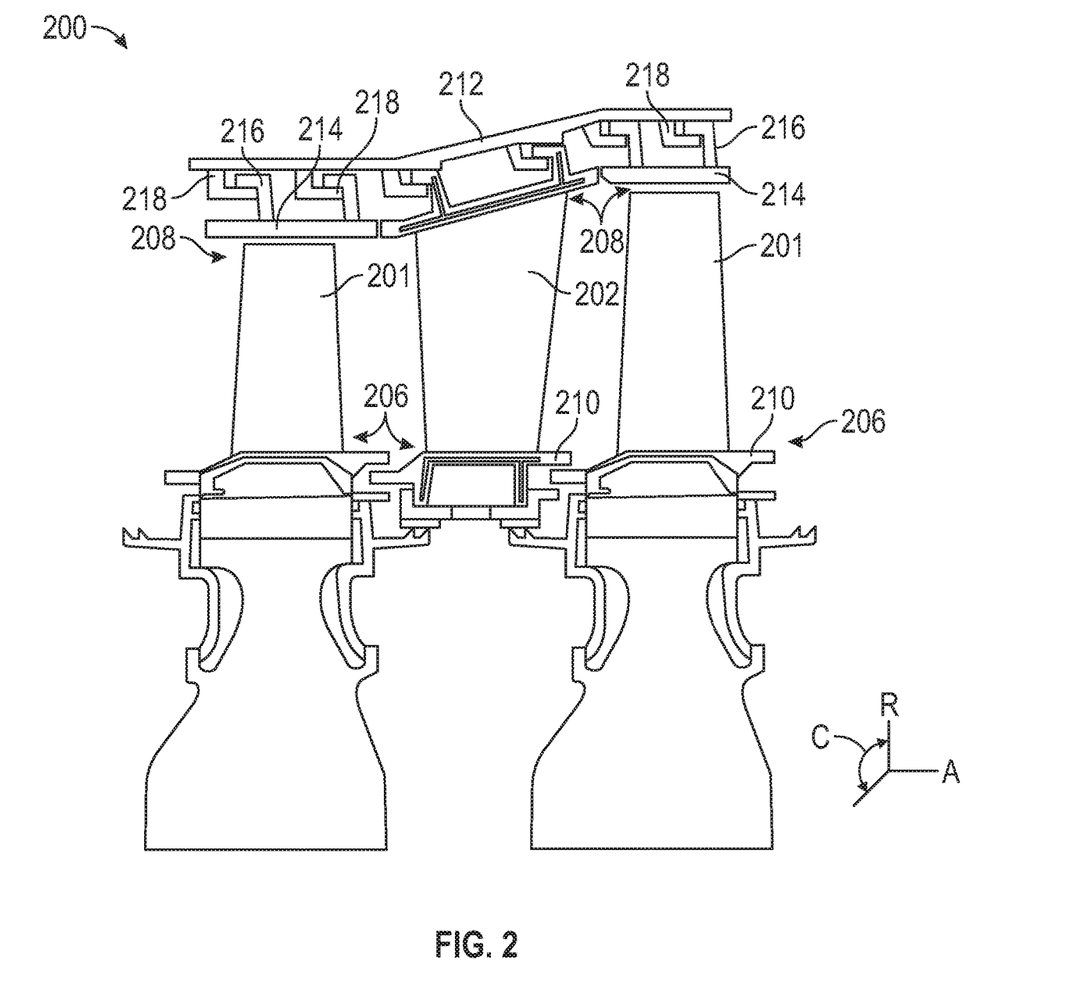
FIG. 2 is a schematic illustration of a portion of a turbine section of the gas turbine engine of FIG. 1.

FIG. 2 is a schematic view of a portion of a turbine section that may employ various embodiments disclosed herein. Turbine section 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201. Similarly, other hooks, as illustratively shown, are arranged to support the vane 202 within the case 212.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Typically, airfoil cooling includes impingement cavities for cooling various hot surfaces of the airfoils. For example, it may be desirable to position a leading edge impingement cavity immediately adjacent to the external leading edge of the airfoil (e.g., left side edge of the airfoils 201, 202). The leading edge impingement cavity is typically supplied cooling airflow from impingement apertures which serve as conduits for cooling air that originates within the leading edge cooling cavities of the airfoil. Further, interior (e.g., axially aft of the leading edge) cavities may be arranged to provide cooling to the pressure and suction sides of the airfoils. Such cavities can include, for example, throughflow cavities (e.g., within vanes) and/or non-throughflow cavities (e.g., serpentine cavities, non-serpentine cavities, cavities that dump air into other internal cavities and/or to the gaspath through exit cooling holes (e.g., through film holes, tip printouts, trailing edge slots, trailing edge discharge holes, etc.)). Throughflow cavities are cavities that are arranged to pass air from an inner diameter to an outer diameter, or vice-versa, of the airfoil. Such throughflow cavities may formed within vanes, with air flowing through inner and outer diameter platforms of the vanes.

Conventional cooled airfoil designs utilize what is referred to as a 'single wall' cooling design. Single wall cooling is achieved through the use of cavities that span the airfoil from the pressure side to the suction side. Single wall cavities are a relatively mature technology and production of such single wall designs may be achieved consistently. For example, typically a vane may be arranged with a throughflow cavity that is a single-wall vane cavity to provide cooling of the vane. Such configurations allow for the utilization of the throughflow (i.e., from one platform to another) for cooling of the vane, but does not allow for segregation of the flow. For example, the throughflow cools both the pressure and the suction side of the vane in a single wall design.

An alternative, and relatively newer cooling technique, is referred to as 'skin core' cooling. A 'skin core' cooling cavity is a cavity defined between a hot, exterior wall or surface (i.e., skin) of an airfoil and a cold, interior wall of the airfoil. The hot, exterior wall is exposed to the gaspath and the cold, interior wall is not exposed to the gas path, but rather is exposed to other internal cooling of the airfoil. Skin core cavities also typically have low aspect ratios, with the height (i.e., distance between hot, exterior wall and cold, interior wall, and being measured in a direction perpendicular to cooling flow within the cavity) being significantly less than a length or width of the cavity in the other direction that is perpendicular to the cooling flow within the cavity (e.g., low height-to-width ratio of 0.8 or less).

In airfoils having skin core cooling, multiple distinct cavities may be arranged between the pressure side and the suction side. Skin core cavities tend to have low aspect ratios as compared to traditional cores. Heat transfer can be greatly enhanced through the use of skin core cavities. In addition, skin cores cavities allow better segregation of cooling flow, which allows for more novel cooling configurations that allow for the same level of cooling with reduced cooling flow. In accordance with embodiments described herein, a throughflow is passed through one or more skin core cavities to provide more advanced cooling of the vane. In some embodiments, a throughflow is passed through one or more suction-side skin core cavities, and in other embodiments, pressure-side skin core cavities may be employed, or combinations thereof. The use of skin core cavities enables the segregation of a throughflow, e.g., to cooling only the suction side. This segregation of the flow allows for more optimized cooling schemes that better meet the demands of the airfoil and allows for reduced cooling flow to the part.

Figure 3A:
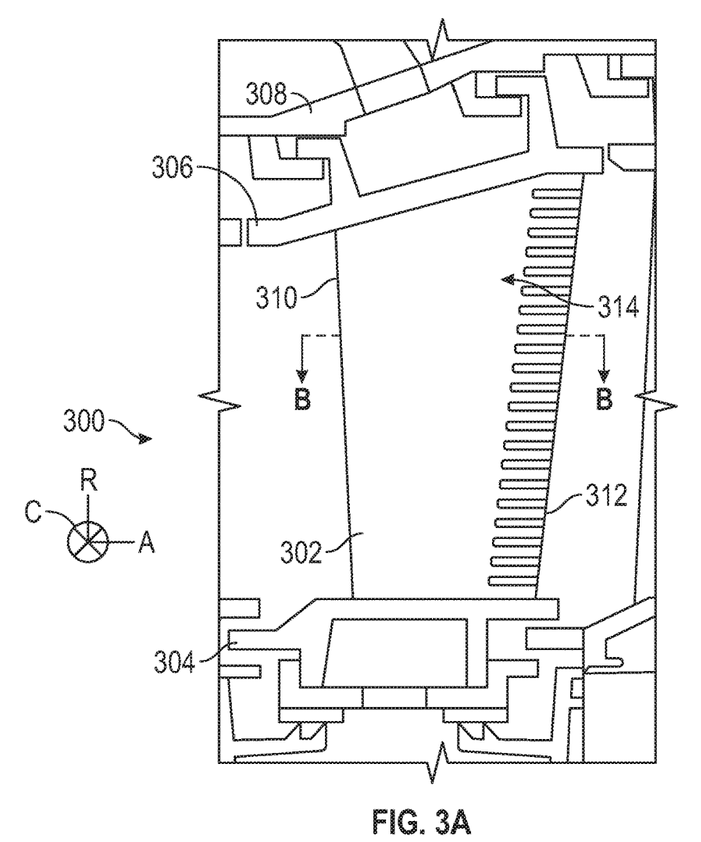
FIG. 3A is a perspective view of a vane that can incorporate embodiments of the present disclosure.
Figure 3B:
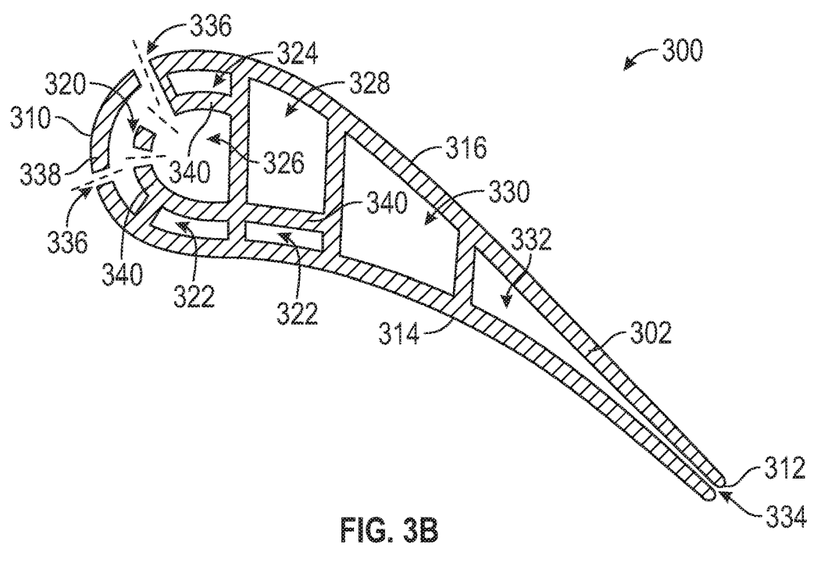
FIG. 3B is a partial cross-sectional view of the vane of FIG. 3A as viewed along the line B-B shown in FIG. 3A.

For example, turning now to FIGS. 3A-3B, schematic illustrations of a vane 300 are shown. FIG. 3A is a side elevation illustration of the vane 300 and FIG. 3B is a cross-sectional illustration of the vane 300 as viewed along the line B-B of FIG. 3A. The vane 300 has an airfoil body 302 that extends from a first platform 304, at an inner diameter, to a second platform 306, at an outer diameter. The platforms 304, 306 may be integrally formed with or attached to the airfoil body 302. The first second platform may be arranged to attach to or engage with a case 308 for installation of the vane 300 within an engine. The airfoil body 302 extends in an axial direction A from a leading edge 310 to a trailing edge 312, and in a radial direction R from the first platform 304 to the second platform 306. In the circumferential direction C, the airfoil body 302 extends between a pressure side 314 and a suction side 316 (opposite the pressure side 314 and shown in FIG. 3B).

As shown in FIG. 3B, illustrating a cross-sectional view of the vane 300, as viewed along the line B-B shown in FIG. 3A, the airfoil body 302 defines or includes a plurality of internal cavities to enable cooling of the vane 300. For example, as shown, the vane 300 includes a plurality of forward and side cooling skin core cavities 320, 322, 324. A leading edge skin core cavity 320 is located along the leading edge 310 of the airfoil body 302, two pressure side skin core cavities 322 are arranged along the pressure side 314 and proximate the leading edge 310, and a suction side skin core cavity 324 is arranged along the suction side 316 and proximate the leading edge 310. In the relative middle of the airfoil body 302, the vane 300 includes various main body cavities 326, 328, 330, 332 and, at the trailing edge 312, a trailing edge slot 334. Some of the main body cavities may form a serpentine flow path through the vane 300, (e.g., cavities 328, 330, 332), with the serpentine flow path defining a cooling flow path to cool portions of the airfoil body 302. One or more of the main body cavities 326, 328, 330, 332 may be arranged to provide cool impinging air into the forward and side cooling skin core cavities 320, 322, 324 (e.g., main body cavity 326). In some embodiments described herein, the main body cavity 326 may be referred to as a leading edge feed cavity. Although shown with a specific internal cooling cavity arrangement, vanes in accordance with the present disclosure may include additional and/or alternative cavities, flow paths, channels, etc. as will be appreciated by those of skill in the art, including, but not limited to, serpentine cavities, trailing edge cavities, etc.

Air that impinges into the leading edge cavity 320 (or other forward and side cooling skin core cavities 320, 322, 324) may be expunged onto a hot external surface of the vane 300 through one or more exit cooling holes 336 (e.g., film cooling holes). During manufacturing of the vane 300, the exit cooling holes 336 may be drilled into or through the external surfaces of the airfoil body 302. With reference to FIG. 3B, the skin core cavities 320, 322, 324 are defined between an external hot wall 338 and internal cold walls 340 of the airfoil body 302. In accordance with embodiments of the present disclosure, the skin core cavities may have very thin heights, e.g., on the order of about 0.015 to 0.050 inches, with the height being a distance between a surface of the cavity along the external hot wall 338 and a surface of the cavity along the internal cold wall 340.

In some embodiments, one or more of the skin core cavities 320, 322, 324 may be throughflow cavities that define a cooling air flow path from the first platform to the second platform (or vice versa), and thus a cooling flow will pass directly through the airfoil body 302. In contrast, the flow within the main body cavities 326, 328, 330, 332 may be limited in extent and not flow through the airfoil body 302, but rather may exit through one or more impingement holes, exit cooling holes (e.g., film cooling holes, trailing edge discharge holes, core print-outs, etc.), trailing edge slots, or otherwise. In some embodiments, the flow through the main body cavities 326, 328, 330, 332 may be throughflow. The cooling air within the main body cavities 326, 328, 330, 332 may be primarily configured to cool the airfoil body 302, whereas the cooling air flowing through the throughflow cavities (e.g., one or more of the skin core cavities 320, 322, 324) may cool a portion of the airfoil body 302 and subsequently flow to cool downstream components, such as downstream vanes, platforms, rotor disks, etc. In some embodiments, throughflow cavities in a vane may be a combination of skin core cavities and main body cavities.

Figure 4:
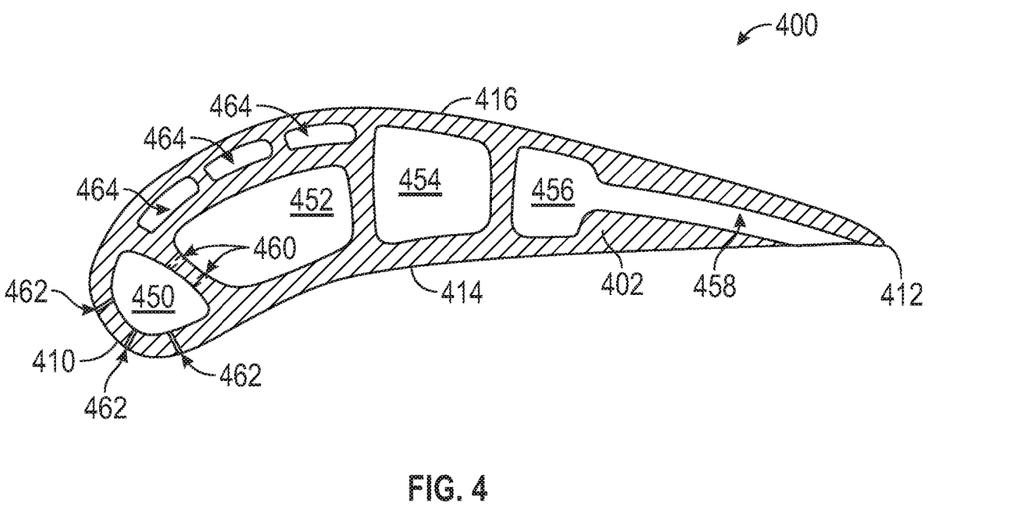
FIG. 4 is a cross-sectional view of a vane in accordance with an embodiment of the present disclosure.

Turning now to FIG. 4, a schematic illustration of a vane 400 in accordance with an embodiment of the present disclosure is shown. The vane 400 is similar to that shown and described above. The vane 400 has an airfoil body 402 that defines a plurality of cooling cavities therein. The airfoil body 402 extends from a leading edge 410 to a trailing edge 412 in an axial direction and between a pressure side 414 and a suction side 416 in a circumferential direction. As shown, the vane 400 includes a leading edge cavity 450, a first main body cavity 452, a second main body cavity 454, and a third main body cavity 456. Further, a plurality of trailing edge slots 458 are formed at the trailing edge 412 of the airfoil body 402, with the trailing edge slots 458 providing a flow path exit for airflow passing through the main body cavities 452, 454, 456. The main body cavities 452, 454, 456, in one non-limiting embodiment, form a serpentine flow path through the airfoil body 402. In other embodiments, the main body cavities 452, 454, 456 may be non-throughflow cavities that dump air into different cavities and/or to the gas path. Further, in some embodiments, one or more of the main body cavities 452, 454, 456 may be throughflow cavities.

As shown, one or more impingement holes 460 can fluidly connect the first main body cavity 452 with the leading edge cavity 450. Further, one or more leading edge exit holes 462 are formed in the material of the airfoil body 402 to expel air from the leading edge cavity 450 and form a cooling film on the exterior surfaces of the airfoil body 402 at the leading edge 410.

As shown, the vane 400 includes three skin core cavities 464 arranged along the suction side 416 of the airfoil body 402. The skin core cavities 464 are throughflow cavities that direct airflow from one platform (either inner or outer diameter) to the other, opposite platform, of the vane 400. In some embodiments, the platforms may be arranged or formed to enable different sourcing of cooling air to the skin core cavities 464 and the leading edge cavity 450 and/or the main body cavities 452, 454, 456.

Although described above with certain configurations, such embodiments are not intended to be limiting. For example, in some embodiments, some of the skin core cavities may be non-throughflow cavities, and in such embodiments, these non-throughflow cavities may dump into the gas path. Further, although shown with groupings of throughflow skin core cavities, such groupings are not to be limiting, and in some embodiments, various different throughflow skin core cavities may be located at multiple, different regions of the airfoil body (e.g., leading edge, pressure side, suction side, trailing edge, and/or combinations thereof). Further, in some embodiments, both throughflow skin core cavities and single-wall throughflow cavities can be employed within a single airfoil.

Figure 5:
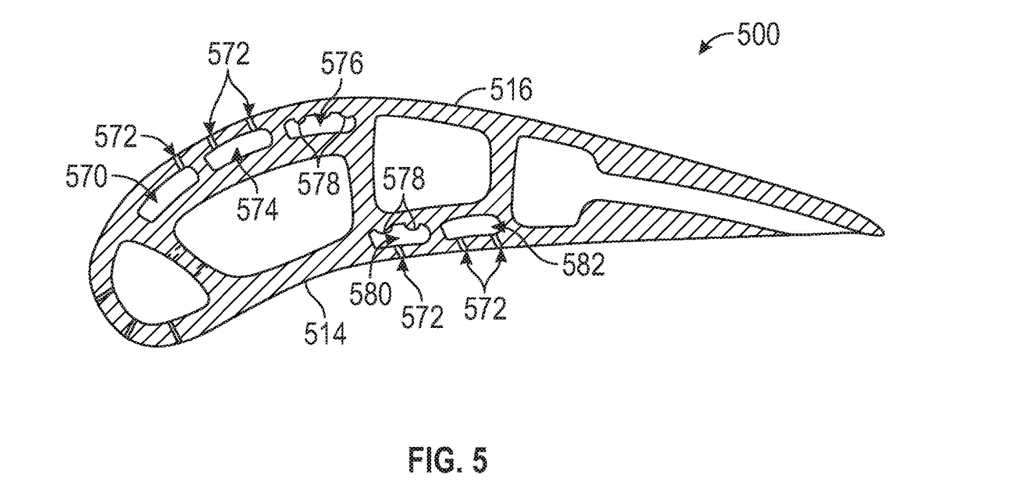
FIG. 5 is a cross-sectional view of a vane in accordance with an embodiment of the present disclosure.

For example, turning now to FIG. 5, a schematic illustration of a vane 500 having various optional features in accordance with embodiments of the present disclosure is shown. The vane 500 may be similar to the above described vanes, and thus similar features may not be described again. In this embodiment, the vane 500 includes a plurality of internal main body cavities and a plurality of skin core cavities, with the skin core cavities having various optional features.

For example, a first skin core cavity 570 may be a smooth-walled cavity having an exit cooling hole 572 arranged to expel cooling air from the first skin core cavity 570 onto a surface of the vane 500. The first skin core cavity 570 is arranged on a suction side 516 of the vane 500. Further, the first skin core cavity 570 may be a throughflow cavity that defines a fluid path between opposing platforms of the vane 500. The cooling air flowing through the first skin core cavity 570 may provide some amount of cooling to the vane 500 (e.g., to the hot suction side wall and through the film cooling) but a majority of the cooling air may flow downstream to cool other components within the gas turbine engine.

A second skin core cavity 574 is arranged aftward of the first skin core cavity 570 along the suction side 516 of the vane 500. The second skin core cavity 574, in this example, is a non-throughflow cavity, and includes exit cooling holes 572 to expel cooling air from the second skin core cavity 574. Cooling air may enter the second skin core cavity 574 from either the inner platform or the outer platform, but the cooling air does not pass to and/or through the opposing platform. Thus, the cooling air within the second skin core cavity 574 is employed primarily for cooling the material of the vane 500 (internally and through the exit cooling holes 572). As illustratively shown, the second skin core cavity 574 is also smooth-walled.

A third skin core cavity 576 is arranged aftward of the second skin core cavity 574 along the suction side 516 of the vane 500 and is a throughflow cavity, which may flow in the same or opposite direction of flow through the first skin core cavity 570. In this embodiments, as illustratively shown, the third skin core cavity 576 includes heat transfer augmentation features 578. The heat transfer augmentation features 578 may be trip strips, pedestal arrays, depot warts, or other heat transfer augmentation features as will be appreciated by those of skill in the art.

Further, the vane 500 includes two skin core cavities 580, 582 located on a pressure side 514 of the vane 500. The skin core cavities 580, 582 may be throughflow or non-throughflow cavities, and may be smooth-walled or include heat transfer augmentation features 578 and/or exit cooling holes 572, as shown. In this embodiment, the skin core cavities 570, 574, 576 on the suction side 516 are located at a different axial location relative to the skin core cavities 580, 582 on the pressure side 514. However, in other embodiments, pressure side and suction side skin core cavities may be located at the same axial positions, either adjacent to each other, or with a main body cavity located therebetween. Accordingly, as will be apparent to those of skill in the art in view of the teachings herein, different arrangements of skin core cavities (throughflow and non-throughflow) may be employed within vanes for gas turbine engines.

Advantageously, embodiments described herein can incorporate skin core cavities within vanes for gas turbine engines. The skin core cavities of the present disclosure are throughflow cavities that can be used to optimize cooling of the vane, and downstream components. Advantageously, embodiments of the present disclosure allow for reduced metal temperatures through the same amount of vane cooling flow. Further in some embodiments, constant metal temperatures may be maintained while reducing cooling flow to the vane. Embodiments of the present disclosure can improve part life through reduced metal temperatures and/or improve engine performance through reductions in cooling flow through the vane.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vane for a gas turbine engine, the vane comprising:
   an airfoil body extending between a first platform and a second platform, the airfoil body having a leading edge, a trailing edge, a pressure side, and a suction side;
   a first main body cavity arranged along a portion of an external hot wall of the pressure side of the airfoil body, the first main body cavity defining a first main body cavity internal cold wall;
   a plurality of suction side skin core cavities defined within the airfoil body along the suction side thereof, wherein at least one suction side skin core cavity of the plurality of suction side skin core cavities defines a throughflow passage through the airfoil body between the first platform and the second platform, wherein each suction side skin core cavity is defined between an external hot wall of the suction side and the first main body cavity internal cold wall;
   a second main body cavity aft of the first main body cavity and arranged along a portion of the external hot wall of the suction side of the airfoil body, the second main body cavity defining a second main body cavity internal cold wall;

a plurality of pressure side skin core cavities defined within the airfoil body along the pressure side thereof, wherein at least one pressure side skin core cavity of the plurality of pressure side skin core cavities defines a throughflow passage through the airfoil body between the first platform and the second platform, wherein each pressure side skin core cavity is defined between the external hot wall of the pressure side and the second main body cavity internal cold wall; and a third main body cavity located aft of the second main body cavity, wherein the first main body cavity, the second main body cavity, and the third main body cavity define a serpentine flow path through the airfoil body.

2. The vane of claim 1, wherein each cavity of the plurality of suction side skin core cavities is a throughflow passage between the first platform and the second platform.

3. The vane of claim 1, wherein each cavity of the plurality of pressure side skin core cavities is a throughflow passage between the first platform and the second platform.

4. The vane of claim 1, wherein the plurality of suction side skin core cavities are located forward of the second main body cavity along the suction side of the airfoil body.

5. The vane of claim 1, wherein a flow direction through the each of the suction side skin core cavities and each of the pressure side skin core cavities are the same.

6. The vane of claim 1, wherein one of the plurality of suction side skin core cavities is a non-throughflow cavity that is connected to an external surface of the vane by at least one exit cooling hole.

7. The vane of claim 1, wherein one of the plurality of pressure side skin core cavities is a non-throughflow cavity that is connected to an external surface of the vane by at least one exit cooling hole.

8. The vane of claim 1, wherein the plurality of pressure side skin core cavities are located aft of the first main body cavity along the pressure side of the airfoil body.

9. The vane of claim 1, wherein the suction side skin core cavities are smooth-walled cavities.

10. The vane of claim 1, wherein the pressure side skin core cavities are smooth-walled cavities.

11. The vane of claim 1, wherein at least one of the suction side skin core cavities or the pressure side skin core cavities include at least one heat transfer augmentation feature.

12. A gas turbine engine comprising:
a turbine section having a plurality of airfoils, wherein at least one airfoil comprises a vane having:
an airfoil body extending between a first platform and a second platform, the airfoil body having a leading edge, a trailing edge, a pressure side, and a suction side;
a first main body cavity arranged along a portion of an external hot wall of the pressure side of the airfoil body, the first main body cavity defining a first main body cavity internal cold wall;

a plurality of suction side skin core cavities defined within the airfoil body along the suction side thereof, wherein at least one suction side skin core cavity of the plurality of suction side skin core cavities defines a throughflow passage through the airfoil body between the first platform and the second platform, wherein each suction side skin core cavity is defined between an external hot wall of the suction side and the first main body cavity internal cold wall;

a second main body cavity aft of the first main body cavity and arranged along a portion of the external hot wall of the suction side of the airfoil body, the second main body cavity defining a second main body cavity internal cold wall;

a plurality of pressure side skin core cavities defined within the airfoil body along the pressure side thereof, wherein at least one pressure side skin core cavity of the plurality of pressure side skin core cavities defines a throughflow passage through the airfoil body between the first platform and the second platform, wherein each pressure side skin core cavity is defined between the external hot wall of the pressure side and the second main body cavity internal cold wall; and a third main body cavity located aft of the second main body cavity, wherein the first main body cavity, the second main body cavity, and the third main body cavity define a serpentine flow path through the airfoil body.

13. The gas turbine engine of claim 12, wherein each cavity of the plurality of suction side skin core cavities is a throughflow passage between the first platform and the second platform.

14. The gas turbine engine of claim 12, wherein each cavity of the plurality of pressure side skin core cavities is a throughflow passage between the first platform and the second platform.

15. The gas turbine engine of claim 14, wherein a flow direction through the each of the suction side skin core cavities and each of the pressure side skin core cavities are the same.

16. The gas turbine engine of claim 12, wherein one of the plurality of suction side skin core cavities is a non-throughflow cavity that is connected to an external surface of the vane by at least one exit cooling hole.

17. The gas turbine engine of claim 12, wherein one of the plurality of pressure side skin core cavities is a non-throughflow cavity that is connected to an external surface of the vane by at least one exit cooling hole.

18. The gas turbine engine of claim 12, wherein the suction side skin core cavities are smooth-walled cavities.

19. The gas turbine engine of claim 12, wherein the pressure side skin core cavities are smooth-walled cavities.

20. The gas turbine engine of claim 12, wherein at least one of the suction side skin core cavities or the pressure side skin core cavities include at least one heat transfer augmentation feature.

* * * * *